United States Patent [19]

Den Boer

[11] Patent Number: 4,478,547
[45] Date of Patent: Oct. 23, 1984

[54] BALE HANDLING APPARATUS

[76] Inventor: Leland A. Den Boer, P.O. Box 364, Lincoln, Mont. 59639

[21] Appl. No.: 428,198

[22] Filed: Sep. 29, 1982

[51] Int. Cl.³ .......................... A01D 87/12; B60P 1/48
[52] U.S. Cl. .................................... 414/24.5; 280/656; 414/111; 414/434; 414/555
[58] Field of Search ...................... 414/24.5, 24.6, 111, 414/434, 435, 436, 510, 555, 679; 280/656

[56] References Cited

U.S. PATENT DOCUMENTS

| 3,508,762 | 4/1970 | Pratt | 280/656 X |
| 4,044,963 | 8/1977 | Hostetler | 414/24.6 |
| 4,253,786 | 3/1981 | Harkness | 414/24.5 |

FOREIGN PATENT DOCUMENTS 348863 2/1922 Fed. Rep. of Germany ...... 280/656

Primary Examiner—Leslie J. Paperner
Attorney, Agent, or Firm—Arthur L. Urban

[57] ABSTRACT

Bale handling apparatus including a base portion, a bale supporting portion, a bale moving portion and a control portion; the base portion including a frame section, the frame section including a first bed section, a wheeled carriage supporting the first bed section, a second bed section, the second bed section being telescopable with respect to the first bed section, the base portion further including a hitch member disposed at the end of the frame section remote from the carriage; the bale supporting portion including support mechanism extending upwardly from each of the bed sections, the support mechanism of the respective bed sections being arranged to be aligned with one another when the bed sections are telescoped together; the bale moving portion including a support section, the support section extending upwardly from the first bed section adjacent the end thereof remote from the second bed section, a shaft member rotatably carried by the support section, the shaft member being oriented transversely of the first bed section, arm members pivotally connected adjacent the ends of the shaft member, grabber mechanism mounted on the arm members, the grabber mechanism extending toward each other; the control portion including mechanism for cooperatively pivoting the arm members with respect to the shaft member, mechanism for rotating the shaft member, and mechanism for telescoping the second bed section with respect to the first bed section.

13 Claims, 3 Drawing Figures

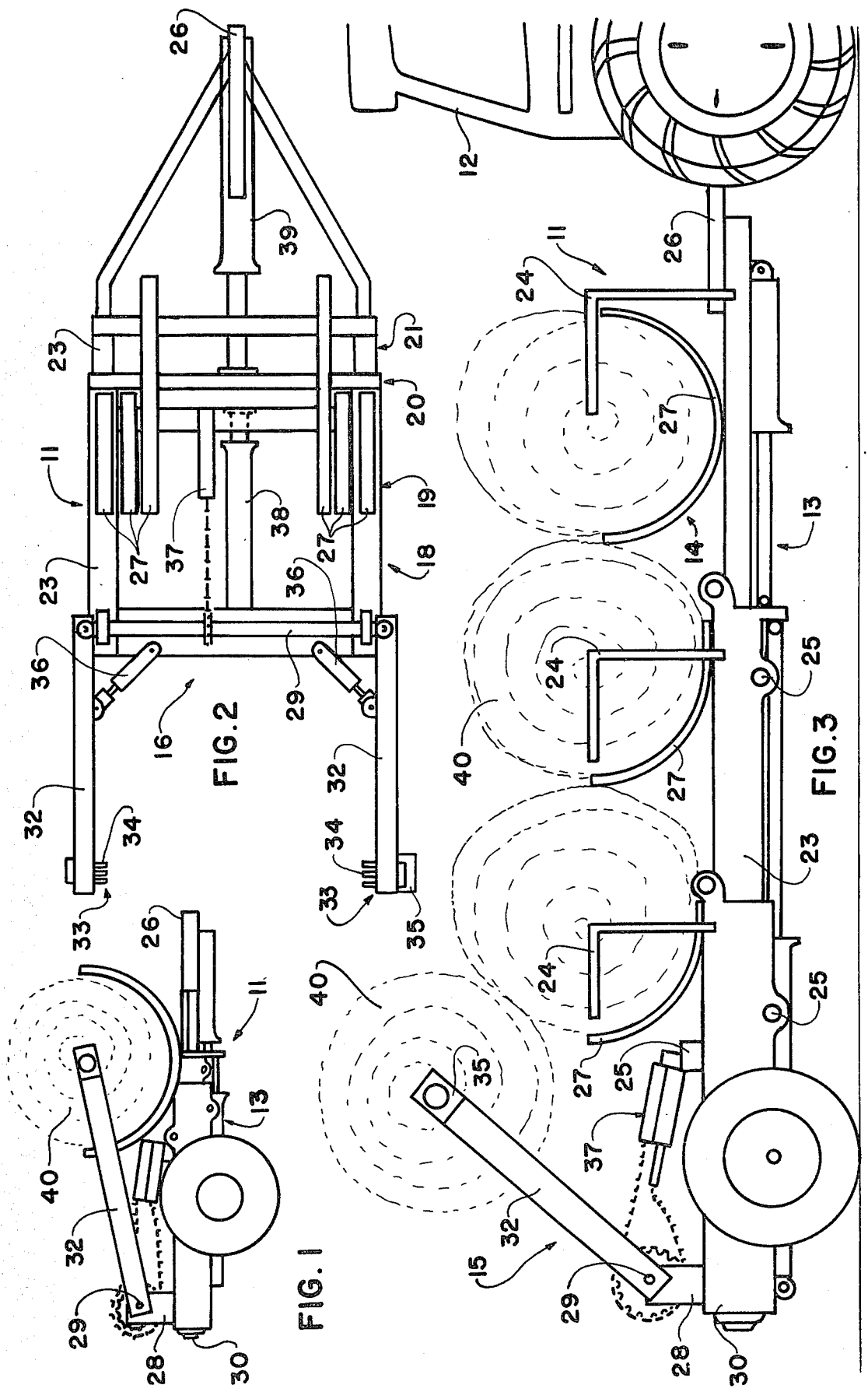

BALE HANDLING APPARATUS

This invention relates to a novel bale handling apparatus and more particularly relates to a new apparatus for handling large bales of forage material.

Many years ago, cut hay and other forage crops were gathered into stacks for storage prior to use as animal feed. While this method was satisfactory when farm labor was readily available and cheap, difficulties in obtaining farm laborers and the high cost of such labor have seen the demise of loose haystacks in recent years.

A variety of solutions have been proposed for reducing the amount of labor required for gathering and storing hay. These proposals frequently have involved the mechanical compression of hay into bales of one shape or another. The use of this type of machinery for baling hay has resulted in a significant reduction in the hand labor previously required for such operations.

Hay often is baled into rectangular bales having a size of about one foot by one and one-half feet by three feet. These bales then are stacked in crossed layers with the bales in one layer having their long dimension at right angles to the long dimension of bales in adjacent layers. Although machinery has been developed to stack rectangular bales, most farmers and ranchers still utilize considerable hand labor with such small bales to achieve the desired right angle straight stacking of the bales.

With the continuing increasing difficulties in obtaining and paying for farm labor, there have been further efforts to develop hay handling methods that can achieve additional reductions in the amount of hand labor required for such operations. One proposal that has received a considerable degree of acceptance has been the baling of hay into large round bales. These bales may be as large as six feet or more in diameter and weigh more than 1,000 pounds.

Round bales have a number of significant advantages over conventional small rectangular bales. Round bales can be gathered from the field and stacked easily by one person with a tractor. A tractor can be equipped with a spear-like projection or a fork lift attachment and the bale lifted off the ground and moved to a desired position. Since a half ton or more of hay can be handled in one simple operation, a substantial quantity of hay can be gathered and stacked in a very short time by a single tractor operator.

While methods such as described above have been developed which greatly reduce the amount of hand labor involved in gathering and storing hay, the subsequent use and feeding of such hay still often involves considerable hand labor. Usually with small rectangular bales, the bales are removed from the stack individually by hand and transferred to the feeding site in a truck or trailer. At the feeding site, each bale is opened by cutting the twine and the hay distributed over the ground.

In feeding animals from the large round bales, the hay may be distributed from the bale by hand or by one of the presently offered tractor accessories. Feeding by hand involves carrying a bale to the field with a tractor, stopping the tractor periodically and getting off to remove and distribute some of the hay by hand.

The commercially available mechanical round bale feeders ordinarily require that the bales be handled one at a time. After a bale has been distributed in the field, the driver must return to the hay storage area, pick up another bale and then drive back to the field to resume the distributing operation. This repeated returning to the hay storage area can waste considerable time and fuel.

The present invention provides a novel apparatus which simplifies the handling of large round bales of hay and other forage. The bale handling apparatus of the invention provides a convenient means for gathering, transferring and/or distributing hay quickly and with a minimum of time and fuel. The bale handling apparatus permits a single person driving a tractor to selectively perform hay gathering, hay transferring or hay feeding operations automatically without hand labor.

The bale handling apparatus of the present invention is simple in design and relatively inexpensive to manufacture. The bale handling apparatus can be fabricated from commercially available materials and components. Conventional farm equipment manufacturing techniques and procedures can be utilized in the fabrication of the apparatus.

The bale handling apparatus is suitable for use under a wide variety of conditions. The apparatus can be installed on a tractor easily in only a few minutes and can be removed as easily when not needed. The feeding apparatus is durable in construction and has a long useful life with little maintenance.

Other benefits and advantages of the novel bale handling apparatus of the present invention will be apparent from the following description and the accompanying drawings in which:

FIG. 1 is a side elevation of one form of bale handling apparatus of the invention in a closed position;

FIG. 2 is a top view of the bale handling apparatus shown in FIG. 1 with the bale moving portion extended; and FIG. 3 is a side elevation of the bale handling apparatus of FIGS. 1 and 2 shown in an extended position.

As shown in the drawings, one form of the novel bale handling apparatus 11 of the present invention is being drawn by a tractor 12. The bale handling apparatus 11 includes a base portion 13, a bale supporting portion 14, a bale moving portion 15 and a control portion 16.

The base portion 13 of the bale handling apparatus 11 includes a frame section 18. The frame section 18 includes a first bed section 19 and a second bed section 20. The frame section 18 advantageously also includes at least one additional bed section 21. Wheeled carriage means 22 support the first bed section 19.

The second bed section 20 is telescopable with respect to the first bed section 19. Likewise, the third bed section 21 is telescopable with respect to the other bed sections 19 and 20. Advantageously, the bed sections 19, 20 and 21 include longitudinal side sections 23 that are telescopable with respect to one another. As shown, the longitudinal side sections 23 on one side of frame section 18 are substantially parallel to the side sections 23 on the other side of the frame section. The bed sections 19, 20 and 21 preferably include guard rails 24. Advantageously, roller means 25 are associated with the telescoping surfaces to facilitate the compression and/or extension of the frame section.

The frame section 18 further includes a hitch member 26. The hitch member 26 is disposed at the end of the frame section remote from the carriage means 22. The hitch member 26 provides a convenient means for attachment of the apparatus 11 to a towing vehicle such as tractor 12.

The bale supporting portion 14 of the bale handling apparatus 11 includes support means 27. The support means 27 extend upwardly from each of the bed sections 19, 20 and 21. The support means 27 of the respective bed sections are arranged to provide alignment with one another when the bed sections are telescoped together. The support means 27 advantageously are disposed adjacent the ends of the bed sections closest to the hitch member 26.

The support means 27 preferably include arcuate sections as shown in the drawings. Advantageously, the support means 27 are disposed in a single plane when the bed sections are telescoped together. It is preferred that the support means 27 of the bed section closest to the hitch member 26, shown in the drawings as third bed section 21, include enlarged arcuate sections.

The bale moving portion 15 of the bale handling apparatus 11 includes a support section 28. The support section 28 extends upwardly from the first bed section 19. The support section 28 is disposed adjacent the end of the first bed section remote from the second bed section 20.

A shaft member 29 is rotatably carried by the support section 28. The shaft member 29 is oriented transversely of the first bed section 19. Advantageously, the shaft member 29 is disposed above and adjacent to the free end 30 of the first bed section 19.

The bale moving portion 15 also includes arm members 32. The arm members 32 are pivotally connected to the shaft member 29 adjacent the ends thereof. Grabber means 33 are mounted on the arm members 32. The grabber means 33 extend toward each other. Advantageously, the grabber means 33 include pins 34 mounted adjacent the free ends of the arm members 32. The pins 34 extend toward and are alignable with one another. Preferably, drive means such as motor 35 is employed to effect rotation of a bale grasped between the grabber means 33.

The control portion 16 of the bale handling apparatus 11 of the invention includes means 36 for cooperatively pivoting the arm members 32 with respect to the shaft member 29 and means 37 for rotating the shaft member 29. In addition, means 38 are provided in the apparatus 11 for telescoping the second bed section 20 with respect to the first bed section 19 as well as means 39 for telescoping third bed section 21 with the other bed sections. Advantageously, the means 36, 37, 38 and 39 are hydraulic drive means such as cylinders and motors.

The bale handling apparatus 11 can be fabricated from commercially available materials and components. For example, the longitudinal side sections 23 of the bed sections 19-21 may be formed of hollow square tubing. Likewise, the bale supports 27 may be formed of steel bars that are bent into arcuate sections. Similarly, commercial hydraulic motors and cylinders may be utilized in the fabrication.

The bale handling apparatus 11 of the present invention may be manufactured to accommodate round bales of a single size or, more advantageously, may be constructed to provide adjustability to enable the apparatus to be used with bales of differing sizes. This may be accomplished by adjusting the strokes of the hydraulic cylinders to lengthen or shorten the bed sections 20 and 21. Also, the bale supports 27 may be moveably attached to the respective bed section to achieve proper placement thereof for different diameter bales. In addition, the effective length of the arm members 32 may be changeable to attain proper positioning of the grabber means 33 adjacent to the axis of the bales.

In the operation of the bale handling apparatus 11 of the present invention as shown in the drawings, the apparatus 11 is attached to a tractor 12 through hitch member 26. To load bales 40, the apparatus 11 with the bed sections 19-21 compressed together is moved into a field containing bales scattered throughout the field.

To pick up a bale, the apparatus 11 is backed into a position with the rear end thereof adjacent to a bale. Then, the arm members 32 are rotated to a rearwardly extending position through the actuation of means 37. At the same time, means 36 is activated to spread the arm members. When the ends of arm members 32 are properly positioned, they are moved toward one another so that the grabber means 33 are forced into the sides of the bale adjacent the axis thereof.

With a bale 40 held tightly by the arm members 32, the bale is lifted by rotating shaft member 29 which causes the arm members 32 to be raised. The bale is moved into a position in which it rests on the supports 27 of the compressed bed sections 19-21.

Thereafter, as the tractor 12 is moved forward, hydraulic cylinder 39 is actuated causing the third bed section 21 to be opened. As this occurs, the bale which rests on the larger arcuate section of the third bed section is retained on that bed section. The apparatus 11 then is moved into a position adjacent another bale. The grabbing and lifting operations are repeated, causing the second bale to be positioned on the supports 27 of the compressed first and second bed sections.

As the apparatus 11 is being moved to a third bale, hydraulic cylinder 38 is activated, causing the second bed section 20 to open, carrying the second bale thereon and freeing the space above the first bed section again. The bale grabbing and lifting operations then are repeated again. After the third bale is loaded onto the supports 27 of the first bed section 19, the apparatus is moved to a fourth bale. The grabbing and lifting operations are repeated again, but since the three bed sections are already loaded, the fourth bale is retained on the arm members 32 and the bale simply bears against the third bale which is resting on the supports 27 of the first bed section 19.

The fully loaded bale handling apparatus 11 may be pulled to a storage area and the bales stacked by reversing the loading operation. First, the fourth bale is unloaded and then the third, second and first in order. To unload the second and first bales, it is necessary to compress the second bed section and then the third bed section in sequence.

When the bale handling apparatus 11 is to be used for feeding, the apparatus can be loaded as described above from a stack or directly from the field. After the apparatus 11 has been loaded, it is pulled to the feeding location.

The bales can be fed automatically without hand labor by removing the fourth bale from the apparatus 11 and placing it on the ground while still retaining the bale between the arm members 32. The bale handling apparatus 11 then is moved forward slowly allowing the hay to unroll from the bale while the bale rotates on the grabber 33. To facilitate the unrolling of the bale, motor 35 may be activated, causing the grabber 33 to rotate the bale held thereon.

When the unrolling of the fourth bale is complete, the third bale which has rested on the first bed section is removed by the arm members 32, placed on the ground with the arm members in contact and the unrolling operation repeated. The unrolling operation is repeated in the same way for each bale until all of the bales have been unrolled for the feeding of the animals. At this point, the three bed sections 19–21 of the apparatus 11 have been compressed together and the tractor with the apparatus can be used to collect and load more bales for feeding or storage.

The above description and the accompanying drawings show that the present invention provides a novel bale handling apparatus. The bale handling apparatus simplifies the handling of large round bales of hay and other forage. The apparatus of the invention provides a convenient means for collecting, transporting, storing or feeding of hay efficiently and with a minimum of expenditure of time and fuel. One person driving a tractor pulling the bale handling apparatus of the invention can perform any or all of the bale collecting, transporting, storing or feeding operations from his driver's station without hand labor.

The bale handling apparatus of the present invention is adaptable for use under a variety of different conditions. The apparatus can be installed on a tractor in only a few minutes and can be removed as easily when the apparatus is not needed.

The bale feeding apparatus is simple in design and relatively inexpensive to manufacture. The apparatus is durable in construction and has a long useful life with little maintenance. The bale feeding apparatus can be fabricated from commercially available materials and components using conventional farm equipment manufacturing techniques and procedures.

It will be apparent that various modifications can be made in the particular bale handling apparatus described in detail and shown in the drawings within the scope of the invention. The size, configuration and arrangement of components can be changed to meet specific requirements. Also, the control portion can be different to facilitate operation of the apparatus with particular vehicles. These and other changes can be made in the bale handling apparatus of the invention provided the functioning and operation of the apparatus are not deleteriously affected. Therefore, the scope of the invention is to be limited only by the following claims.

What is claimed is:

1. Bale handling apparatus including a base portion, a bale supporting portion, a bale moving portion and a control portion; said base portion including a frame section, said frame section including a first bed section, wheeled carriage means supporting said first bed section, a second bed section, said second bed section being telescopable with respect to said first bed section, said base portion further including a hitch member disposed at the end of said frame section remote from said carriage means; said bale supporting portion including support means extending upwardly from each of said bed sections, the support means of the respective bed sections being arranged to be aligned with one another when said bed sections are telescoped together; said bale moving portion including a support section, said support section extending upwardly from said first bed section adjacent the end thereof remote from said second bed section, a shaft member rotatably carried by said support section, said shaft member being oriented transversely of said first bed section, arm members pivotally connected adjacent the ends of said shaft member, grabber means mounted on said arm members, said grabber means extending toward each other; said control portion including means for cooperatively pivoting said arm members with respect to said shaft member, means for rotating said shaft member, and means for telescoping said second bed section with respect to said first bed section; whereby a plurality of individual bales can be loaded sequentially onto said bed sections of said apparatus, transported to a different location and thereafter unloaded in reverse order for storage or feeding.

2. Bale handling apparatus according to claim 1 wherein said first and second bed sections include longitudinal side sections that are telescopable with respect to one another.

3. Bale handling apparatus according to claim 1 wherein said frame section includes at least one additional bed section telescopable with said other bed sections.

4. Bale handling apparatus according to claim 1 including roller means associated with said telescopable side sections of said bed sections.

5. Bale handling apparatus according to claim 1 wherein said support means include arcuate sections.

6. Bale handling apparatus according to claim 1 wherein said support means are disposed adjacent the ends of said bed sections closest to said hitch member.

7. Bale handling apparatus according to claim 1 wherein said support means are disposed in a single plane when said bed sections are telescoped together.

8. Bale handling apparatus according to claim 1 wherein said support means of the bed section closest to said hitch member include larger arcuate sections.

9. Bale handling apparatus according to claim 1 wherein said shaft member is disposed above and adjacent to the free end of said first bed section.

10. Bale handling apparatus according to claim 1 wherein said grabber means includes pins mounted adjacent the free ends of said arm members, which pins extend toward and are alignable with one another.

11. Bale handling apparatus according to claim 1 wherein said bed sections include guard rails along the edges thereof.

12. Bale handling apparatus according to claim 1 wherein said grabber means includes drive means.

13. Bale handling apparatus according to claim 1 including means for adjusting the position of said bed sections and said support means thereof to accommodate bales of differing size.

* * * * *